US011622196B2

(12) United States Patent
Lee et al.

(10) Patent No.: US 11,622,196 B2
(45) Date of Patent: Apr. 4, 2023

(54) METHOD FOR TRANSMITTING AUDIO DATA BY USING SHORT-RANGE WIRELESS COMMUNICATION IN WIRELESS COMMUNICATION SYSTEM, AND APPARATUS FOR SAME

(71) Applicant: LG ELECTRONICS INC., Seoul (KR)

(72) Inventors: Hyeonjae Lee, Seoul (KR); Minsoo Lee, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/833,547

(22) Filed: Jun. 6, 2022

(65) Prior Publication Data
US 2022/0312116 A1    Sep. 29, 2022

Related U.S. Application Data

(63) Continuation of application No. PCT/KR2020/017762, filed on Dec. 7, 2020.

(30) Foreign Application Priority Data

Dec. 6, 2019  (KR) .......................... 10-2019-0162087

(51) Int. Cl.
*H04R 3/00*    (2006.01)
*H04R 3/12*    (2006.01)
(Continued)

(52) U.S. Cl.
CPC .............. *H04R 3/12* (2013.01); *H04R 1/403* (2013.01); *H04R 29/002* (2013.01); *H04W 4/80* (2018.02);
(Continued)

(58) Field of Classification Search
CPC ...... H04R 1/403; H04R 1/402; H04R 29/002; H04R 2430/01; H04R 2420/07; H04R 3/00; H04R 3/12
(Continued)

(56) References Cited

U.S. PATENT DOCUMENTS 8,971,546 B2 *  3/2015  Millington ............. H04R 27/00
                                                         381/105
10,805,750 B2 * 10/2020  Audfray .................... H04R 3/12
(Continued)

FOREIGN PATENT DOCUMENTS

KR  10-2015-0041974   4/2015
KR  10-2017-0058321   5/2017
(Continued)

OTHER PUBLICATIONS

PCT International Application No. PCT/KR2020/017762, International Search Report dated Mar. 26, 2021, 4 pages.

*Primary Examiner* — Disler Paul
(74) *Attorney, Agent, or Firm* — Lee Hong Degerman Kang Waimey

(57) ABSTRACT

The present disclosure relates to a method by which a third device transmits audio data in a short-range wireless communication system, and an apparatus for same. According to the present disclosure, the method comprising: receiving, from a first device and a second device, capability information related to the audio data output capabilities of the first device and the second device; determining, based on the capability information, whether to form a channel for audio data transmission between the first device and the second device; transmitting, to the first device and the second device, setting information for outputting audio data of the first device and the second device, based on the determination result; and transmitting the audio data to the first device and the second device, wherein the positions and the audio
(Continued)

data output time points of the first device and the second device are determined based on the setting information.

14 Claims, 11 Drawing Sheets

(51) Int. Cl.
*H04W 4/80* (2018.01)
*H04R 1/40* (2006.01)
*H04R 29/00* (2006.01)

(52) U.S. Cl.
CPC ...... *H04R 2420/07* (2013.01); *H04R 2430/01* (2013.01)

(58) Field of Classification Search
USPC ................ 381/77–82, 56, 58, 103, 303, 107
See application file for complete search history.

(56) References Cited

U.S. PATENT DOCUMENTS

| | | | |
|---|---|---|---|
| 10,824,387 B2 * | 11/2020 | Barton | H04N 21/439 |
| 10,827,264 B2 * | 11/2020 | Garner | H03G 5/165 |
| 2013/0279706 A1 * | 10/2013 | Marti | G06F 1/1688 |
| | | | 381/57 |
| 2018/0242098 A1 | 8/2018 | Pratt et al. | |

FOREIGN PATENT DOCUMENTS

| | | |
|---|---|---|
| KR | 10-2017-0094080 | 8/2017 |
| KR | 10-2019-0014494 | 2/2019 |

\* cited by examiner

[FIG. 1]
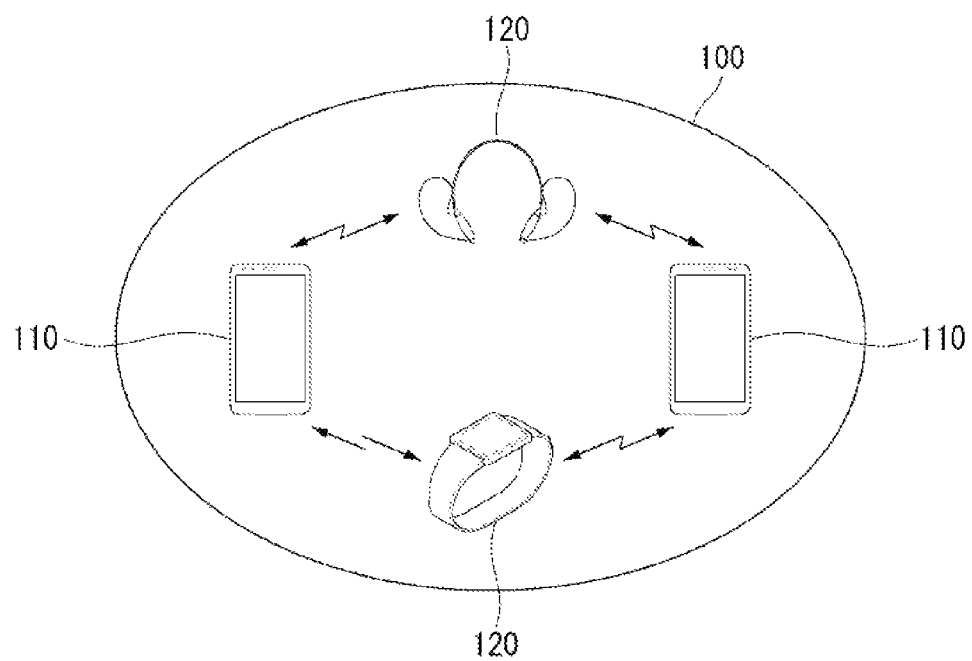

[FIG. 2]
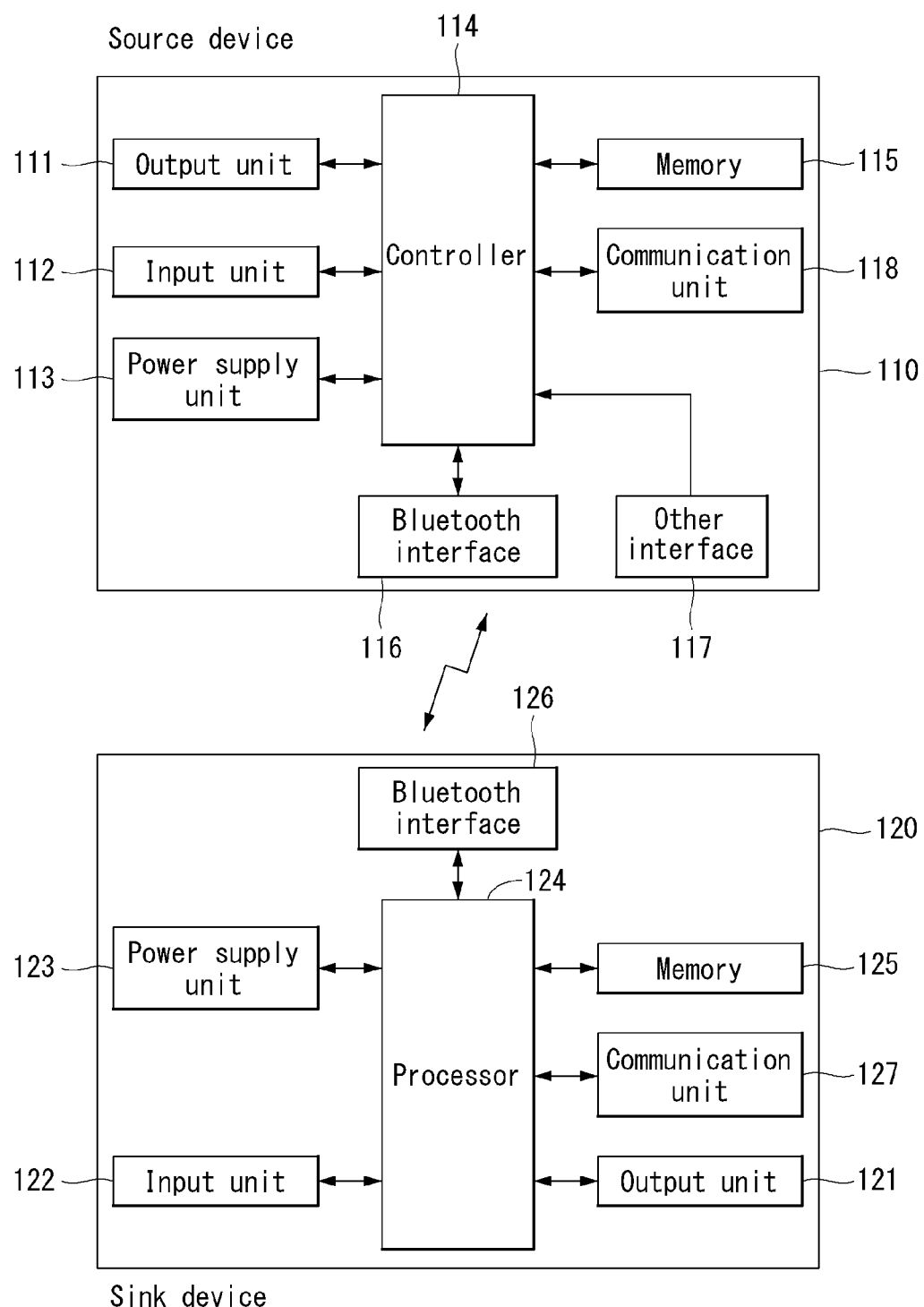

[FIG. 3]
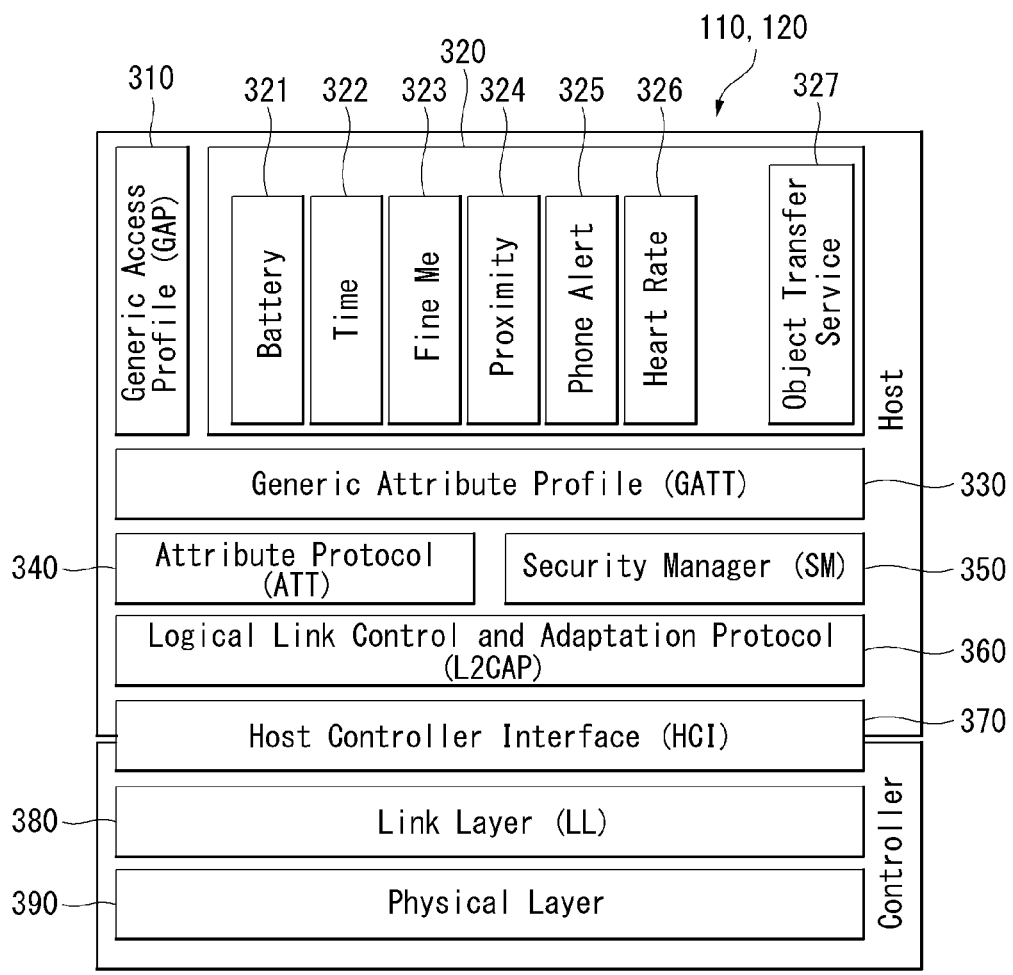

[FIG. 4]
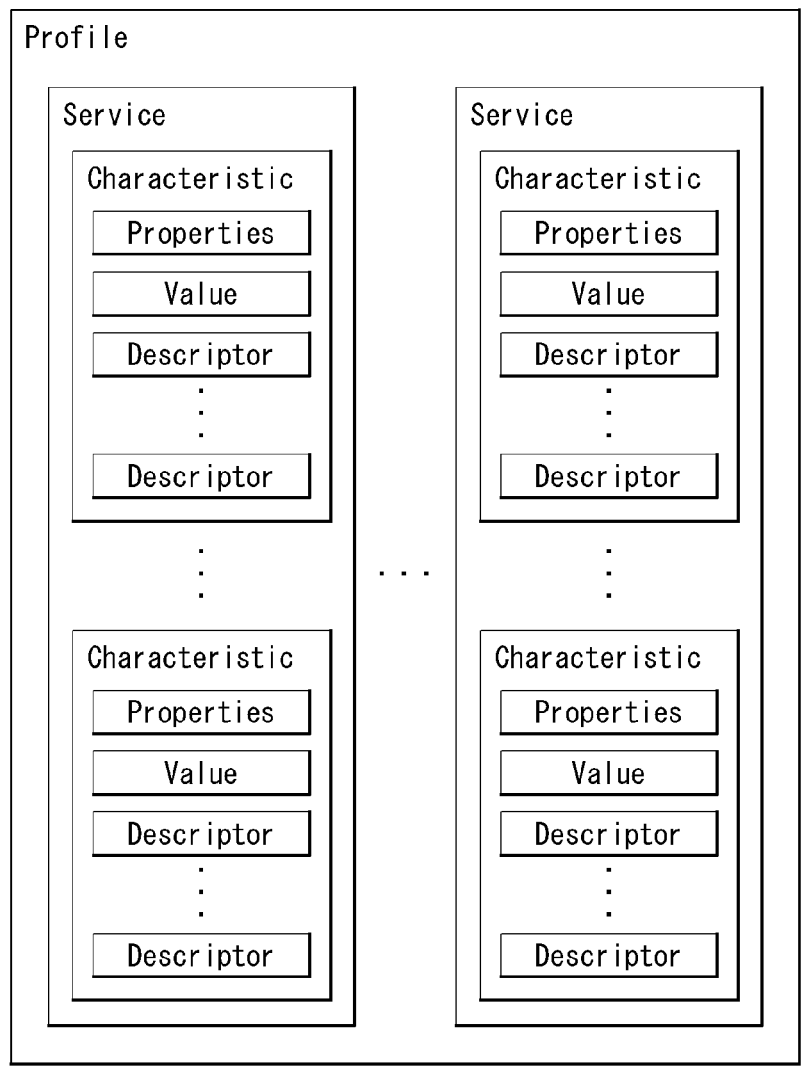

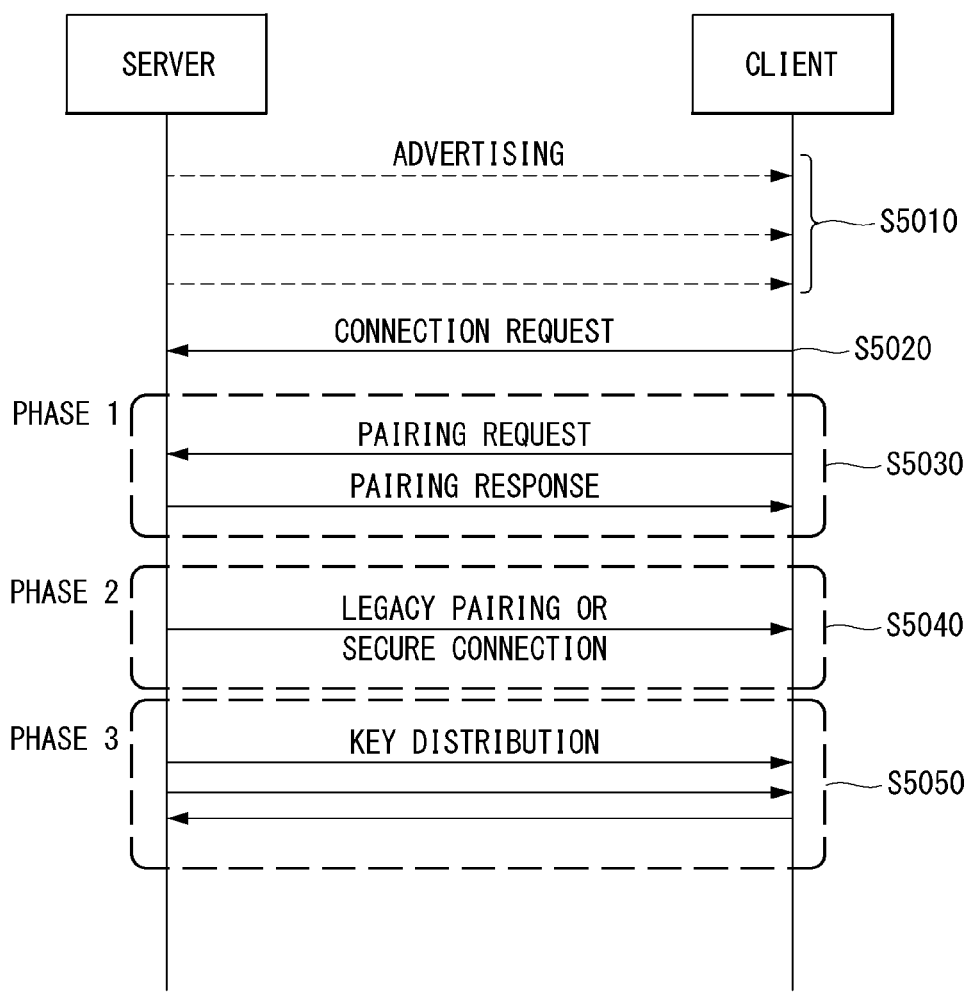

[FIG. 6]
(a)
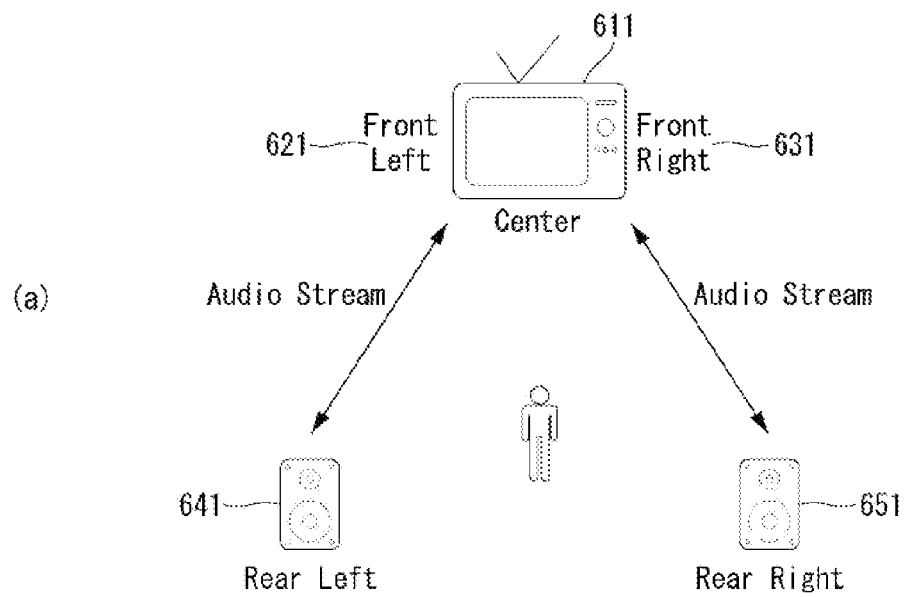
(b)
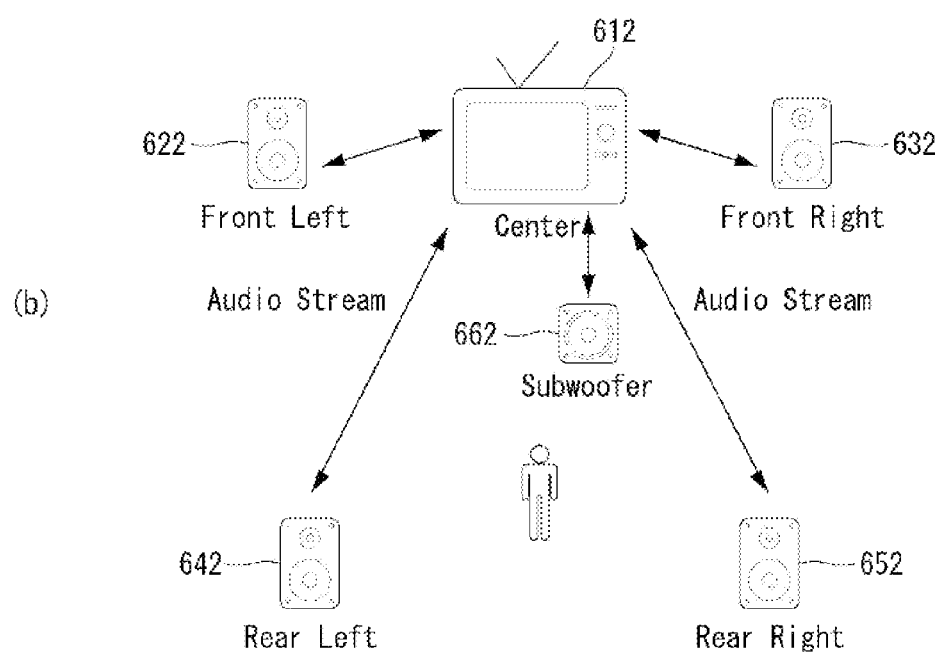

[FIG. 7]
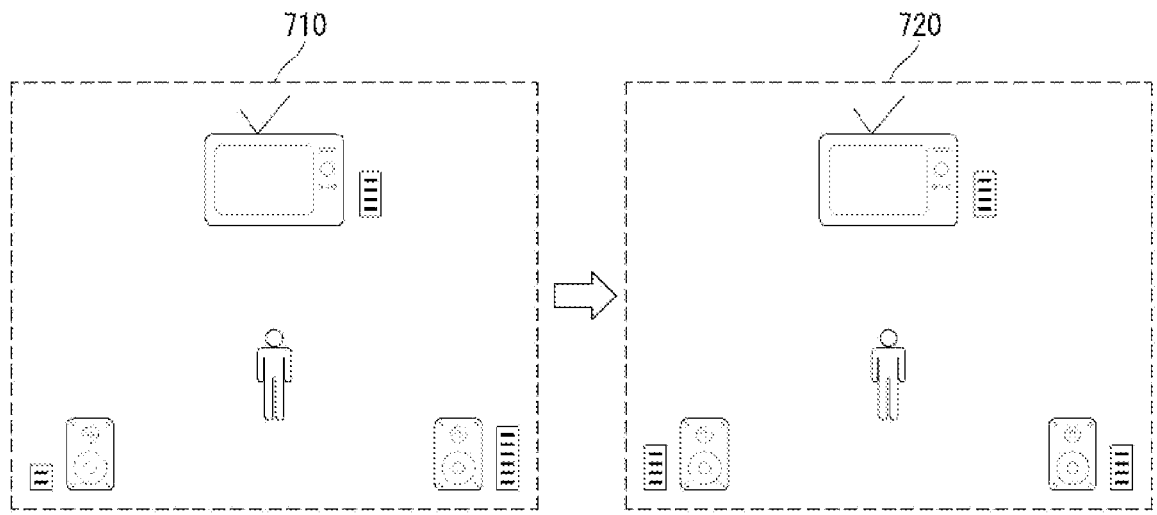
[FIG. 8]
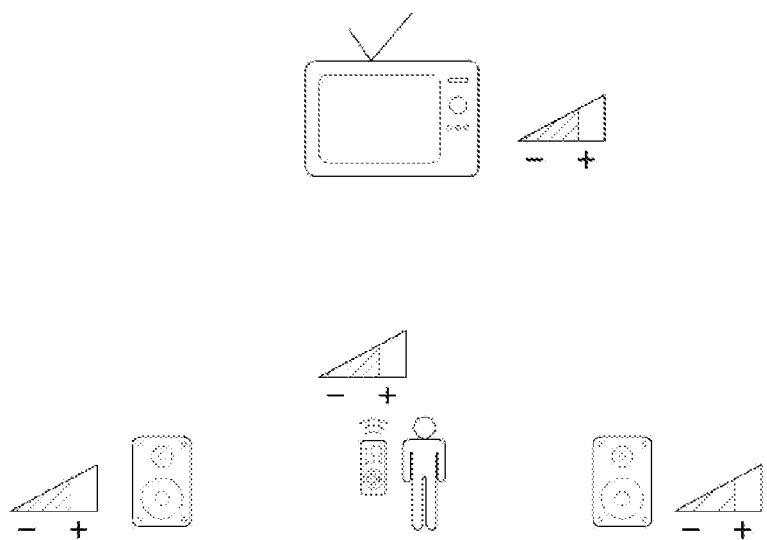

[FIG. 9]
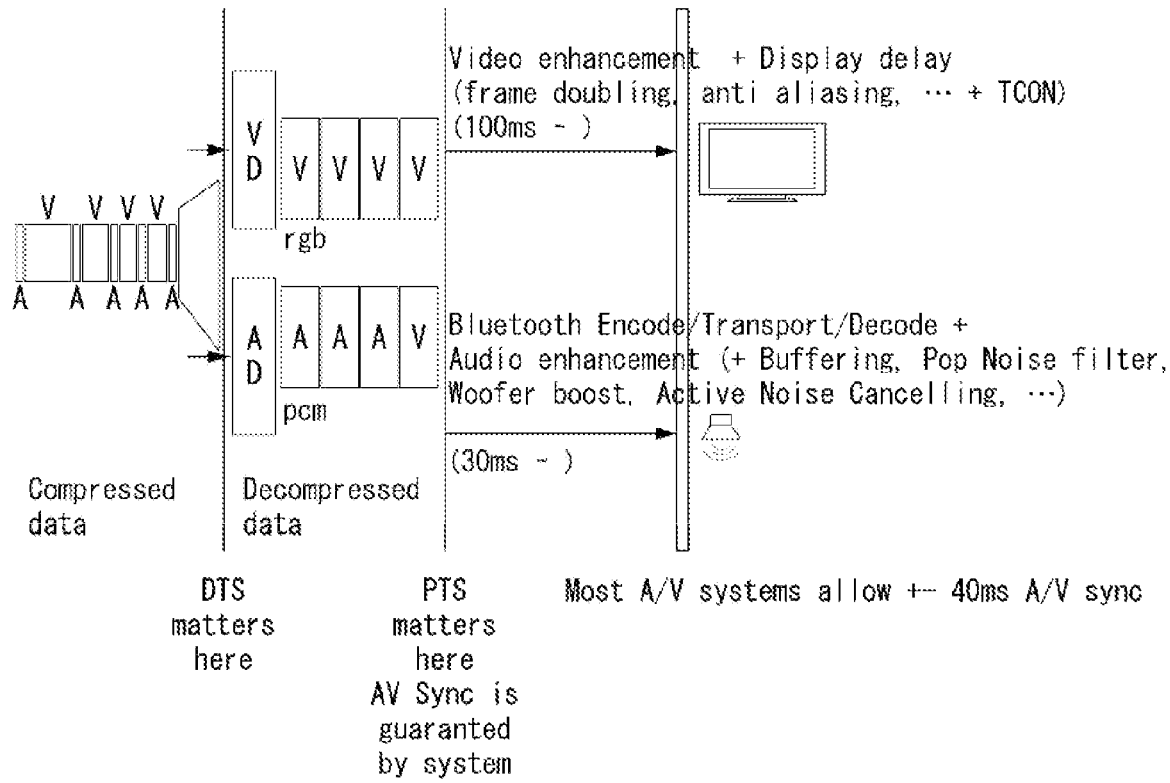
[FIG. 10]
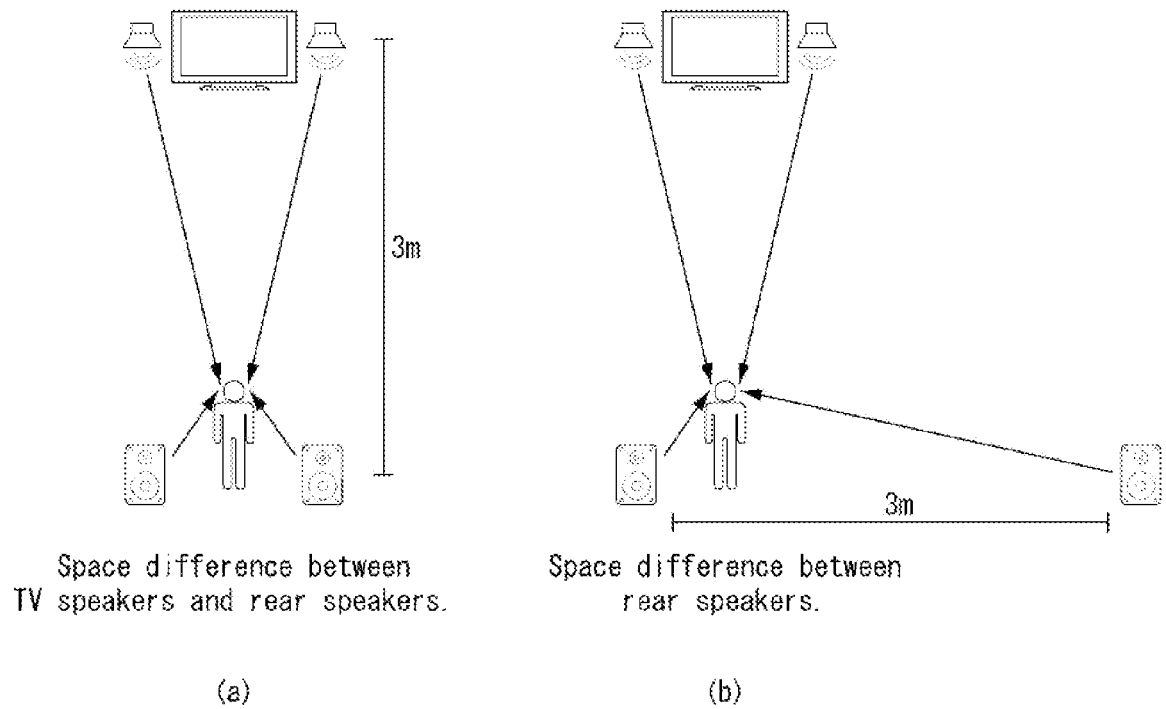
(a) Space difference between TV speakers and rear speakers.
(b) Space difference between rear speakers.

[FIG. 11]
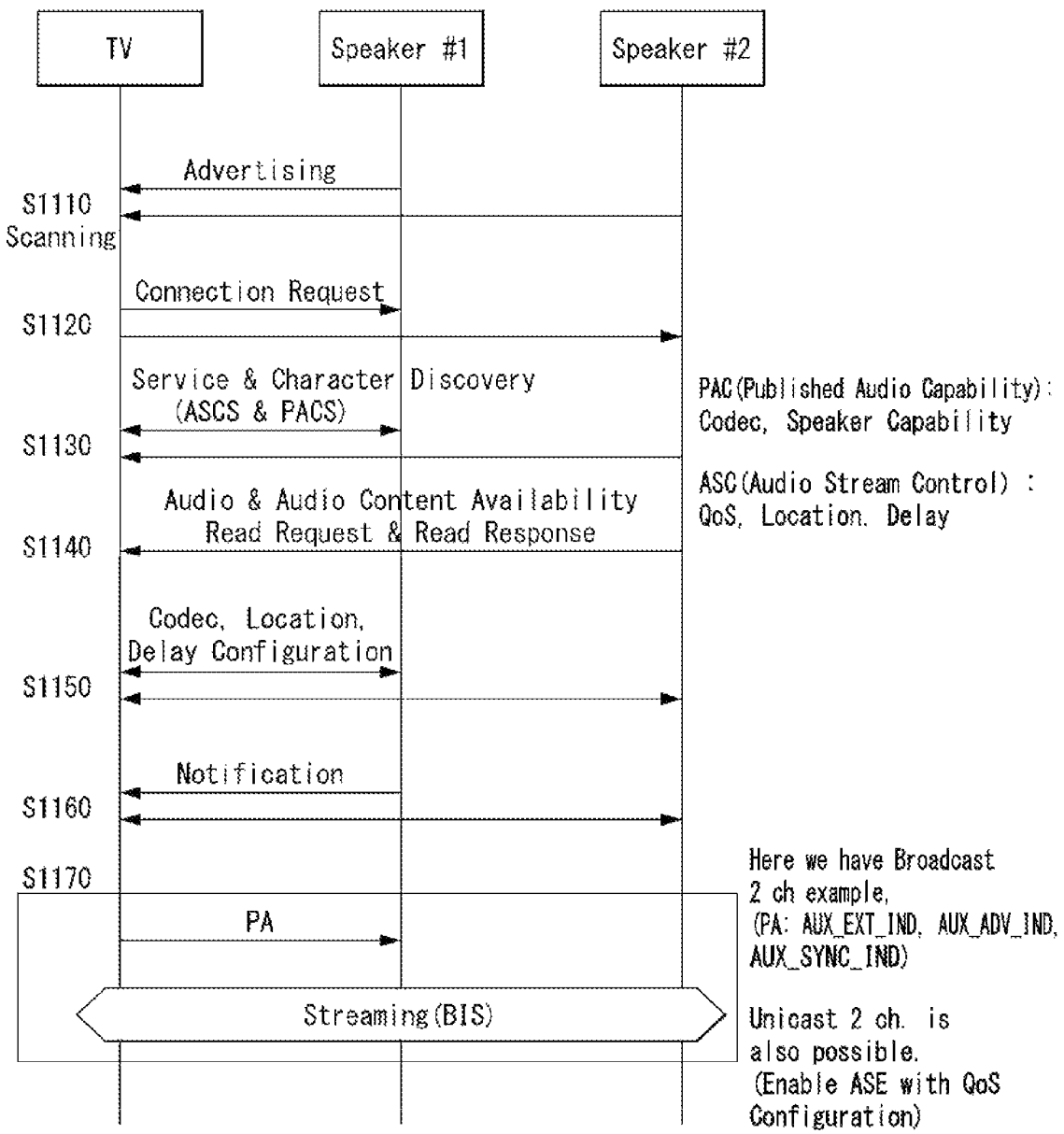

[FIG. 12]
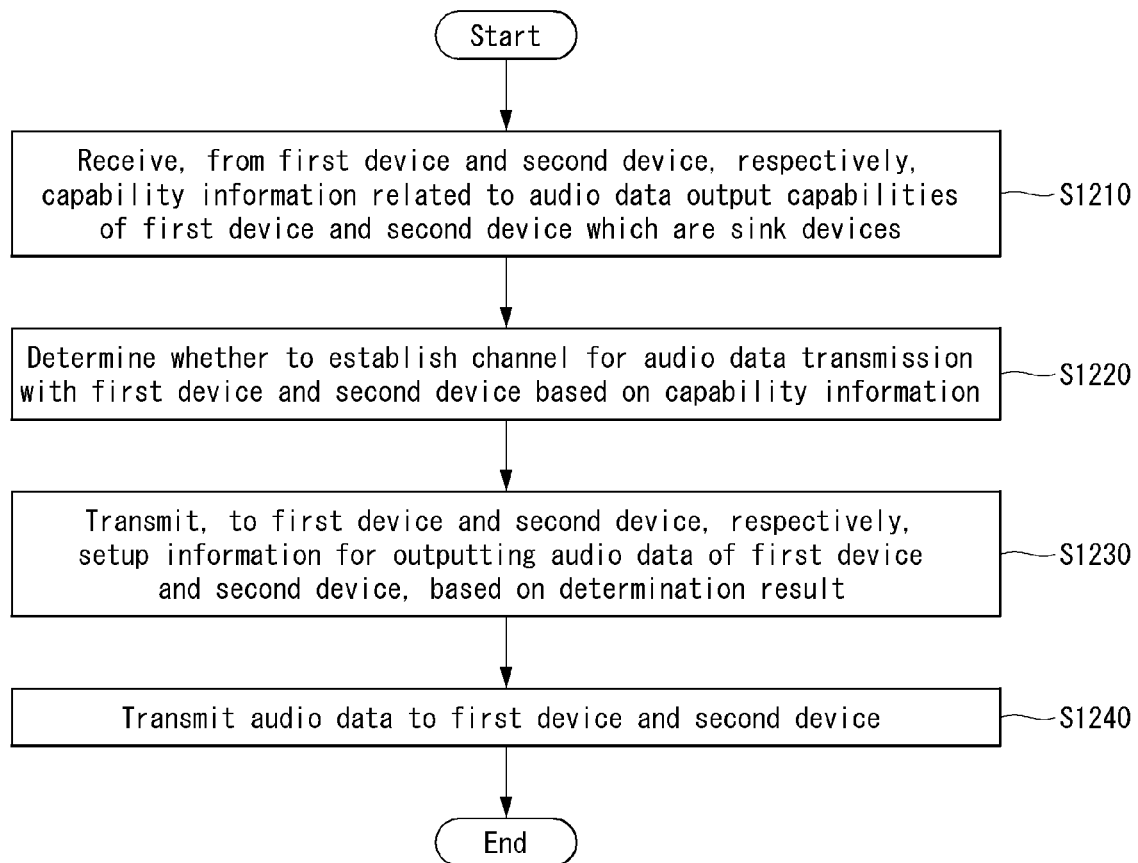

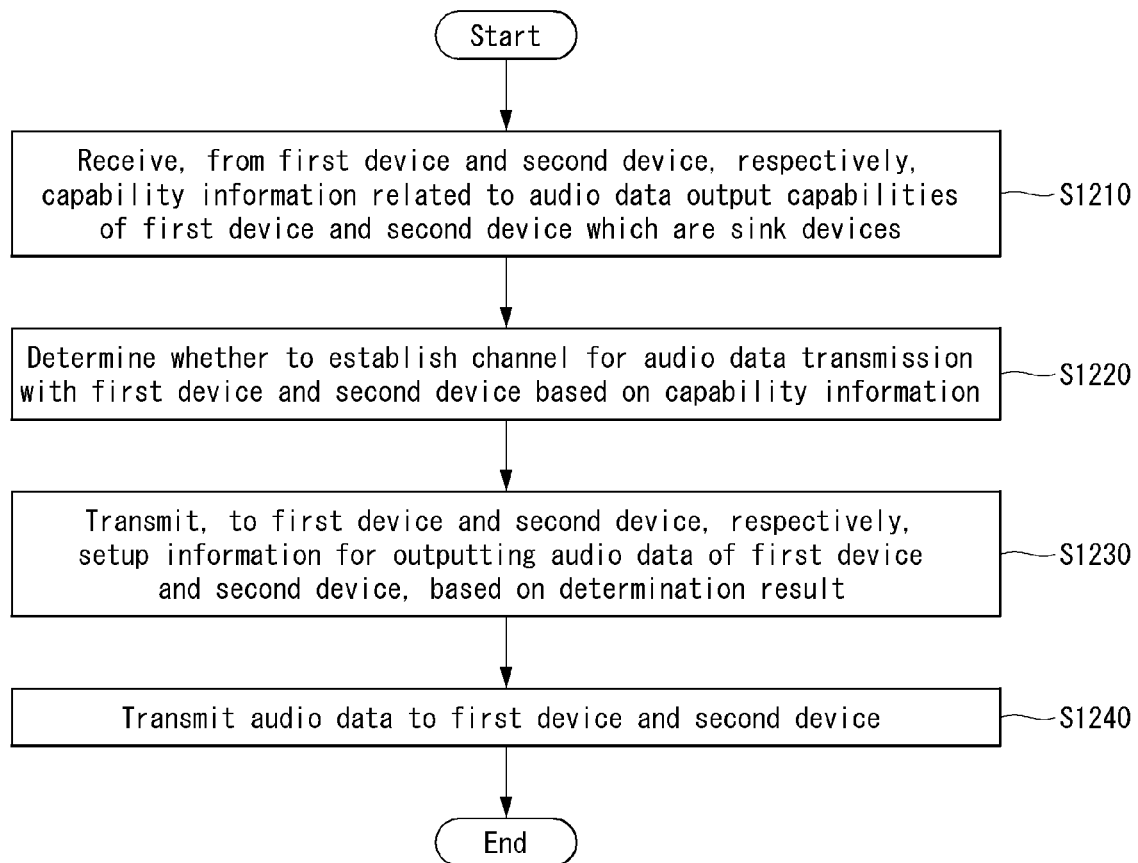
[FIG. 13]

METHOD FOR TRANSMITTING AUDIO DATA BY USING SHORT-RANGE WIRELESS COMMUNICATION IN WIRELESS COMMUNICATION SYSTEM, AND APPARATUS FOR SAME

CROSS-REFERENCE TO RELATED APPLICATIONS

This application is a continuation of International Application No. PCT/KR2020/017762, filed on Dec. 7, 2020, which claims the benefit of earlier filing date and right of priority to Korean Application No. 10-2019-0162087, filed on Dec. 6, 2019, the contents of which are all hereby incorporated by reference herein in their entireties.

TECHNICAL FIELD

The present disclosure relates to a wireless communication system, and more particularly, to a method and an apparatus for transmitting audio data using short-range wireless communication.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The present disclosure is to provide a method and apparatus for transmitting audio data, performed by a third device, using short-range wireless communication in a wireless communication system.

Furthermore, the present disclosure is to provide a method of obtaining, by a third device, information related to audio data output capabilities of devices outputting audio data, and an apparatus therefor.

Furthermore, the present disclosure is to provide a method of performing, by the third device, a setup for audio data outputs of the devices outputting the audio data based on the information related to audio data output capabilities of the devices outputting the audio data, and an apparatus therefor.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method of transmitting audio data, by a third device, and apparatus therefor.

Specifically, a method of transmitting audio data, by a third device, in a short-range wireless communication system, the method comprising: receiving, from a first device and a second device, respectively, capability information related to audio data output capabilities of the first device and the second device; determining whether to establish a channel for audio data transmission with the first device and the second device based on the capability information; transmitting, to the first device and the second device, respectively, configuration information for outputting audio data of the first device and the second device, based on the determination result; and transmitting, to the first device and the second device, the audio data; wherein positions of the first device and the second device and an audio data output time of the first device and the second device are determined based on the configuration information.

Furthermore, in the present disclosure, wherein the capability information includes frequency response range information related to a frequency range in which the first device and the second device can output the audio data.

Furthermore, in the present disclosure, wherein the capability information further comprises sound pressure level (SPL) information of the first device and the second device.

Furthermore, in the present disclosure, wherein the SPL information is determined based on audio data output volumes of the first device and the second device set to a specific value being measured at a specific distance.

Furthermore, in the present disclosure, wherein the specific value is 1 watt and the specific distance is 1 meter.

Furthermore, in the present disclosure, wherein the capability information includes (i) broadcast support information on whether the first device and the second device can receive the audio data based on a broadcast method and (ii) effective audio data output volume information related to a volume at which the first device and the second device can output the audio data.

Furthermore, in the present disclosure, wherein the capability information further includes frequency response curve information related to the frequency response curves of the first device and the second device, wherein the frequency response curve represents audio data output volumes of the first device and the second device for each frequency, and wherein the frequency response curve information is configured based on (i) a partial frequency extracted from an entire frequency range included in the frequency response curve and (ii) a partial audio data output volume for each of the partial frequency.

Furthermore, in the present disclosure, wherein the configuration information includes position information related to positions of the first device and the second device in the short-range wireless system.

Furthermore, in the present disclosure, wherein the configuration information further includes output timing information on the audio data output time of the first device and the second device, and wherein the output timing information is configured based on a distance between each of (i) positions of the first device and the second device and (ii) a position of a user listening to the audio data output from the first device and the second device.

Furthermore, in the present disclosure, wherein receiving the capability information further comprises: transmitting, to the first device and the second device, respectively, a read request message for obtaining the capability information from a first characteristic of the first device and the second device in which the capability information is stored; and receiving, from the first device and the second device, respectively, a read response message including the capability information.

Furthermore, in the present disclosure, wherein transmitting the configuration information further comprises: transmitting, to the first device and the second device, respectively, a write request message for writing the position information and the output timing information to second characteristics of the first device and the second device; and receiving, from the first device and the second device, respectively, a write response message including information related to whether or not the writing of the position information and the output timing information is successful.

Furthermore, in the present disclosure, wherein the first characteristic is a Published Audio Capability Service (PACS) characteristic, wherein the second characteristic is an Audio Stream Control Service (ASCS) characteristic.

Furthermore, in the present disclosure, a method of receiving audio data by a first device in a short-range wireless communication system, the method comprising: transmitting, to a third device, capability information related to the audio data output capability of the first device, whether to establish a channel with the third device for receiving the audio data is determined based on the capability information; receiving, from the third device, configuration information for outputting audio data of the first device based on whether the channel is established; receiving, from the third device, the audio data; and determining a position of the first device and an audio data output time of the first device based on the configuration information.

Furthermore, in the present disclosure, a third device for transmitting audio data in a short-range wireless communication system, the third device comprising: a transmitter for transmitting a radio signal; a receiver for receiving a radio signal; and a processor operatively connected to the transmitter and the receiver; wherein the processor is configured to: receive, from a first device and a second device, respectively, capability information related to audio data output capabilities of the first device and the second device; determine whether to establish a channel for audio data transmission with the first device and the second device based on the capability information; transmit, to the first device and the second device, respectively, configuration information for outputting audio data of the first device and the second device, based on the determination result; and transmit, to the first device and the second device, the audio data; wherein positions of the first device and the second device and an audio data output time of the first device and the second device are determined based on the configuration information.

Furthermore, in the present disclosure, a first device for receiving audio data in a short-range wireless communication system, the first device comprising: a transmitter for transmitting a radio signal; a receiver for receiving a radio signal; and a processor operatively connected to the transmitter and the receiver; wherein the processor is configured to: transmit, to a third device, capability information related to the audio data output capability of the first device, whether to establish a channel with the third device for receiving the audio data is determined based on the capability information; receive, from the third device, configuration information for outputting audio data of the first device based on whether the channel is established; receive, from the third device, the audio data; and determine a position of the first device and an audio data output time of the first device based on the configuration information.

Advantageous Effects

According to the present disclosure, there is an effect of transmitting audio data, performed by a third device, using short-range wireless communication in a wireless communication system.

Furthermore, according to the present disclosure, there is an effect in that the third device is capable of obtaining the information on the audio data output capabilities of the devices outputting the audio data in the wireless communication system.

Furthermore, according to the present disclosure, there is an effect in that the third device is capable of performing the setup for audio data outputs of the devices outputting the audio data based on the information related to audio data output capabilities of the devices outputting the audio data in the wireless communication system.

Furthermore, according to the present disclosure, there is an effect in that the third device is capable of performing the setup for audio data outputs of the devices outputting the audio data based on the information related to audio data output capabilities of the devices outputting the audio data in the wireless communication system.

Further, the present disclosure has an effect that the third device is capable of effectively constituting the multi channel surround system constituted by the devices outputting the audio data in the wireless communication system.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present disclosure, provide embodiments of the present disclosure, and together with the detailed description, describe the technical features of the present disclosure.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 is a diagram illustrating an example of a user scenario of a multi-channel surround system to which methods proposed by the present disclosure may be applied.

FIG. 7 is a diagram illustrating another example of the user scenario of the multi-channel surround system to which methods proposed by the present disclosure may be applied.

FIG. 8 is a diagram illustrating yet another example of the user scenario of the multi-channel surround system to which methods proposed by the present disclosure may be applied.

FIG. 9 is a diagram illustrating still yet another example of the user scenario of the multi-channel surround system to which methods proposed by the present disclosure may be applied.

FIG. 10 is a diagram illustrating still yet another example of the user scenario of the multi-channel surround system to which methods proposed by the present disclosure may be applied.

FIG. 11 is a flowchart illustrating an example in which a method proposed by the present disclosure is performed.

FIG. 12 is a flowchart illustrating an example of an operation implemented in a source device performing a method of transmitting, by a source device, audio data in a wireless communication system proposed by the present disclosure.

FIG. 13 is a flowchart showing an example of an operation implemented in a sink device performing a method of receiving, by the sink device, the audio data in the wireless communication system proposed by the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.
Time: A method for exchanging time information.

FindMe: A method for providing an alarm service according to the distance.

Proximity: A method for exchanging battery information.
Time: A method for exchanging time information The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Hereinafter, a method of transmitting audio data using short-range wireless communication in a wireless communication system will be described in detail.

In the present disclosure, a device transmitting audio data may be expressed as a third device, a control device, a source device, a client device, etc., and may be variously expressed with a range of being interpreted the same or similar meaning thereas, of course. Further, the device transmitting the audio data may be a device which may autonomously output video data, and may be, for example, a TV, etc. Further, a device receiving and outputting the audio data may be expressed as a first device, a second device, a sink device, a server device, etc., and may be variously expressed with a range of being interpreted the same or similar meaning thereas, of course. The device receiving the audio data may be a speaker, etc.

In the present disclosure, a source device may transmit audio data to a sink device by using a unicast scheme and a broadcast scheme (i.e., may provide an audio data streaming service).

For convenience of description, hereinafter, the device transmitting the audio data will be collectively referred to as the source device and the device receiving the audio data will be collectively referred to as the sink device.

The audio data transmitting method using the short-range wireless communication in the wireless communication system proposed by the present disclosure may be applied to a case where the source device transmits the audio data to at least one sink device, and in particular, more preferably applied to a case where the number of sink devices are two or more. In this case, a system constituted by the source device and the at least one sink device may be expressed as a multi channel surround system, a multi channel surround audio system, etc., and may be variously expressed with a range of being interpreted the same or similar meaning thereas, of course.

In the present disclosure, in order to constitute the multi channel surround system, (1) a method of obtaining, by the source device, capability information for a capability related to an audio data output of the sink device from the sink device (a method of obtaining, by the source device, sink device capability information, Proposal 1) and (2) a method of performing, by the source device, a setup for the audio data output of the sink device for the sink device based on the obtained capability information (a method of performing, by the source device, a setup for the sink device, Proposal 2) are proposed.

User Scenario

Prior to specifically describing the method of obtaining, by the source device, sink device capability information (Proposal 1) and the method of performing, by the source device, a setup for the sink device (Proposal 2), user scenarios handled in the multi channel surround system will be described with reference to FIGS. 6 to 10.

FIG. 6 is a diagram illustrating an example of a user scenario of a multi-channel surround system to which methods proposed by the present disclosure may be applied.

FIG. 6(a) illustrates an example of a multi channel surround system constituted by (i) one TV 611 and (ii) two speakers 641 and 651 corresponding to rear left and rear right, respectively. More specifically, in FIG. 6(a), the TV 611 is embedded with two speakers 621 and 631 corresponding to front left and front right, respectively. In this case, the TV 611 may be the source device, two speakers 621 and 631 corresponding to front left and front right, respectively and two speakers 641 and 651 corresponding to rear left and rear right, respectively, which are embedded in the TV 611 may be the sink devices.

In FIG. 6(a), the TV 611 may transmit audio data (or audio stream) to two speakers 641 and 651 corresponding to rear left and rear right, respectively. In this case, the TV 611 may transmit the audio data based on a broadcast scheme and/or a unicast scheme. Two speakers 641 and 651 corresponding to rear left and rear right, respectively may receive, decode, and output the audio data. In two speakers 621 and 631 corresponding to front left and front right, respectively, which are embedded in the TV 611, such an operation may be performed by the same scheme. That is, the operations performed in two speakers 641 and 651 corresponding to rear left and rear right, respectively may be internally performed in relationships with the TV 611 and two speakers 621 and 631 corresponding to front left and front right, respectively.

FIG. 6(b) illustrates an example of a multi channel surround system constituted by (i) one TV 612, (ii) two speakers 622 and 632 corresponding to rear left and front right, respectively, and (iii) two speakers 642 and 652 corresponding to rear left and rear right, respectively. In this case, the TV 612 may be the source device, two speakers 622 and 632 corresponding to front left and front right, respectively and two speakers 642 and 652 corresponding to rear left and rear right, respectively, which are embedded in the TV 611 may be the sink devices.

In FIG. 6(b), the TV 612 may transmit the audio data (or audio stream) to two speakers 622 and 632 corresponding to rear left and front right, respectively and two speakers 642 and 652 corresponding to rear left and rear right, respectively. In this case, the TV 612 may transmit the audio data based on the broadcast scheme and/or the unicast scheme. Two speakers 622 and 632 corresponding to rear left and front right, respectively and two speakers 642 and 652 corresponding to rear left and rear right, respectively may receive, decode, and output the audio data.

FIG. 7 is a diagram illustrating another example of the user scenario of the multi-channel surround system to which methods proposed by the present disclosure may be applied.

More specifically, FIG. 7 relates to a user scenario of controlling audio data output volumes of the speakers constituting the multi channel surround system. The multi channel surround system illustrated in FIG. 7 is constituted by (i) a TV, (ii) a speaker embedded in the TV, and (iii) two speakers corresponding to rear left and rear right, respectively.

In reference numeral 710 of FIG. 7, volumes of the speaker embedded in the TV, and two speakers corresponding to rear left and rear right, respectively are set to be different from each other. The volumes of the speakers constituting the multi channel surround system are preferably set so as for a user to recognize sizes of the audio data output from the speakers as the same size. In reference numeral 720 of FIG. 7, it can be seen that the volumes of two speakers corresponding to rear left and rear right, respectively are set as the volumes having the same size as the volume of the speaker embedded in the TV. In order to set the volumes of two speakers corresponding to rear left and rear right, respectively, the TV may transmit signals for setting the volumes of two speakers corresponding to rear left and rear right, respectively to the two speakers.

FIG. 8 is a diagram illustrating yet another example of the user scenario of the multi-channel surround system to which methods proposed by the present disclosure may be applied.

More specifically, FIG. 8 relates to a user scenario of controlling audio data output volumes of the speakers constituting the multi channel surround system. The multi channel surround system illustrated in FIG. 8 is constituted by (i) a TV, (ii) a speaker embedded in the TV, and (iii) two speakers corresponding to rear left and rear right, respectively. Further in FIG. 8, the user may use a control device for controlling volumes of (i) a TV, (ii) a speaker embedded in the TV, and (iii) two speakers corresponding to rear left and rear right, respectively. The control device may be remote controller of the TV, etc.

In FIG. 8, volumes of the speaker embedded in the TV, and two speakers corresponding to rear left and rear right, respectively are set to be different from each other. The user may set the volumes of (i) the speaker embedded in the TV and (ii) two speakers corresponding to rear left and rear right, respectively to be the same by using the control device. More specifically, the control device may transmit signals for setting the volumes of (i) the speaker embedded in the TV and (ii) two speakers corresponding to rear left and rear right, respectively to the two speakers.

FIG. 9 is a diagram illustrating still yet another example of the user scenario of the multi-channel surround system to which methods proposed by the present disclosure may be applied.

More specifically, FIG. 9 relates to a user scenario of synchronizing a video data output time in the TV constituting the multi channel surround system and an audio data output time in the speaker constituting the multi channel surround system. In this case, the TV may be the source device, and the speaker may be the sink device. That is, the TV as the source device may play both a role of transmitting the audio data to the speaker and a role of outputting video data related to the audio data. A processing time for the TV to output the video data and a processing time for the speaker to output the received audio data may be different from each other. Accordingly, in order to determine the video data output time of the TV and the audio data output time of the speaker, the processing time for the video data output of the TV and the processing time of the audio data output of the speaker should be considered. To this end, the TV may obtain information on the processing time for the audio data output of the speaker from the speakers. Thereafter, the TV may determine the video data output time thereof based on the obtained processing time for the audio data output of the speaker and the processing tie for the video data output thereof. Further, the TV may determine the audio data output time of the speakers and transmits information on the determined audio data output time to the speakers. Through such an operation, the audio data output time in the TV and the audio data output time in the speakers may coincide with each other.

FIG. 10 is a diagram illustrating still yet another example of the user scenario of the multi-channel surround system to which methods proposed by the present disclosure may be applied.

More specifically, FIG. 10 relates to a user scenario of calibrating a distance difference when distances between the respective speakers constituting the multi channel surround system and the user are different from each other. When the respective speakers and the user are different from each other, even though the respective speakers simultaneously output the audio data, time points when sounds of the output audio data reach the user from the respective speakers are different from each other. Accordingly, when the distances between the respective speakers and the user are different from each other, it is necessary to calibrate difference in distance between the respective speakers and the user.

In FIG. 10(a), a distance (first distance) between the speaker corresponding to front left embedded in the TV and the user and a distance (second distance) between the speaker corresponding to front right and the user are the same as each other. Further, in FIG. 10(a), a distance (third distance) between the speaker corresponding to rear left and the user and a distance (fourth distance) between the speaker corresponding to rear right and the user are the same as each other. However, the distances (first distance and second distance) between the front speakers and the user and the distances (third distance and fourth distance) between the rear speakers and the user are different from each other. Accordingly, when the front speakers and the rear speakers simultaneously output the audio data, time points when the sounds of the audio data output from the front speakers and the rear speakers, respectively reach the user are different from each other. Therefore, time points when the front speakers and the rear speakers output the audio data should be calibrated so that the sounds of the audio data output from the front speakers and the rear speakers, respectively reach the user at the same time point. More specifically, the control device of the TV or the user may identify distance information between the user and the speakers, and set the audio data output time points of the speakers in the speakers based on the identified distance information.

In FIG. 10(b), the distance (first distance) between the speaker corresponding to front left embedded in the TV and the user, the distance (second distance) between the speaker corresponding to front right and the user, and the distance (third distance) between the speaker corresponding to rear right and the user are the same as each other. However, the distances (first distance, second distance, and third distance) between the front speakers and the speaker corresponding to rear right, and the user, and the distance (fourth distance) between the rear left speaker and the user are different from each other. Accordingly, when the front speakers and the rear speakers simultaneously output the audio data, time points when the sounds of the audio data output from the front speakers and the rear speakers, respectively reach the user are different from each other. Therefore, the time points when the front speakers and the rear speakers output the audio data should be calibrated so that the sounds of the audio data output from the front speakers and the rear speakers, respectively reach the user at the same time point. More specifically, the control device of the TV or the user may identify distance information between the user and the speakers, and set the audio data output time points of the speakers in the speakers based on the identified distance information.

Method of Obtaining, by the Source Device, Sink Device Capability Information (Proposal 1) and Method of Setting, by the Source Device, Setup for the Sync Device (Proposal 2)

Hereinafter, the method of obtaining, by the source device, the sink device capability information (Proposal 1) and the method of setting, by the source device, the setup for the sync device (Proposal 2) will be described in detail.

FIG. 11 is a flowchart illustrating an example in which a method proposed by the present disclosure is performed.

For convenience of description, the operation in which the method proposed by the present disclosure is performed by the TV which is the source device will be primarily described.

First, the TV performs a scanning operation, and receives an advertising message from a first speaker (Speaker #1) and a second speaker (Speaker #2) which are the sink devices.

Next, the TV transmits messages for a connection request to the first speaker and the second speaker, respectively (S1120).

Thereafter, the TV performs a service and character discovery procedure with the first speaker and the second speaker (S1130). Through this, the TV may identify services and characteristics required for transmitting the audio data to the first and second speakers. More specifically, the services required for transmitting the audio data may include a published audio capability (PAC) service and an audio stream control (ASC) service. In this case, the TV may use the PAC service in order to obtain capability information related to a capability related to the audio data outputs of the first and second speakers. Further, the TV may use the ASC service in order to perform the setup for the audio data output for the first and second speakers.

Next, the TV which identifies the services required for transmitting a read request message for obtaining the capability information to the first and second speakers, and receives a read response message from the first and second speakers in response thereto (S1140). The read response message may include the capability information. Here, the TV may determine whether to constitute the multi channel surround system jointly with the first and second speakers based on the capability information. That is, the TV may determine whether to establish a channel for audio data transmission jointly with each of the first and second speakers.

Thereafter, the TV performs the setup for the audio data outputs of the first and second speakers for the first and second speakers based on the obtained capability information (S1150). More specifically, the TV may transmit setup information for the audio data outputs to the first and second speakers, respectively in order to perform the setup for the audio data outputs of the first and second speakers.

Next, the TV receives notification messages from the first and second speakers in response thereto (S1160). The notification messages may include information indicating whether the setup for the audio data outputs of the first and second speakers of the TV is successful.

Last, the TV transmits a periodic advertising message for the audio data transmission, establishes the channel for the audio data transmission jointly with the first and second speakers, and transmits the audio data to the first and second speakers through the generated channel (S1170).

Hereinafter, each of the method of obtaining, by the source device, the sink device capability information (Proposal 1) and the method of setting, by the source device, the setup for the sync device (Proposal 2) will be described in more detail.

Method of Obtaining, by Source Device, Sink Device Capability Information—(Proposal 1)

The proposal relates to the method of obtaining, by the source device, the capability information of the sink device, and may correspond to step S1140 of FIG. 11 above.

Table 2 below shows information (parameters) included in the capability information which the source device receives from the sink device.

TABLE 2

| Parameter | Size (octets) | Description |
| --- | --- | --- |
| Watt | 1 | Effective Wattage of this speaker |
| Broadcast Support | 1 | Tag for Supporting Broadcast Audio sink |
| Freq. Response Range | 1 | Freq. Response range of this speaker. |
| Sound Pressure level | 1 | SPL of 1 W amp at 1 m distance |

As shown in Table 2 above, the capability information for the capability related to the audio data output of the sink device which the source device receives from the sink device may include a parameter 'Broadcast Support' which is information indicating whether the sink device may receive the audio data based on the broadcast scheme. The parameter 'Broadcast Support' may be expressed as broadcast support information, and may be variously expressed within a range of being interpreted as the same/similar meaning thereas, of course.

Further, the capability information may further include a parameter 'Watt' which is information related to the size of the volume at which the sink device is capable of output the audio data. The parameter 'Watt' may be expressed as 'effective audio data output volume information', and may be variously expressed within a range of being interpreted as the same/similar meaning thereas, of course.

Further, the capability information may further include a parameter 'Freq. Response Range' which is information related to a frequency range at which the sink device is capable of output the audio data. The parameter 'Freq. Response Range' may be expressed as frequency response range information, and may be variously expressed within a range of being interpreted as the same/similar meaning thereas, of course. More specifically, the sink device may output the audio data only at a frequency within a range indicated by the parameter 'Freq. Response Range', and not output the audio data at a frequency other than the range indicated by the parameter 'Freq. Response Range'. In other words, only when the frequency of the audio data which is the input data input into the sink device is within the range indicated by the parameter 'Freq. Response Range', the sink device may output the audio data, and when the frequency of the audio data which is the input data input is out of the range indicated by the parameter 'Freq. Response Range', the sink device may not output the audio data.

Further, the capability information may further include a parameter 'Sound Pressure Level' which is information on a sound pressure level (SPL) of the sink device. The parameter 'Sound Pressure Level' may be expressed as SPL information, and may be variously expressed within a range of being interpreted as the same/similar meaning thereas, of course.

The SPL information may be configured based on setting the audio data output volume of the sink device to a specific value and measuring the audio data output volume of the sink device set to a specific value at a specific distance. In this case, the specific value may be 1 watt and the specific distance may be set to 1 meter.

Additionally, although not illustrated in Table 2 above, the capability information may further include frequency response curve information related to frequency response curves of the first and second devices. More specifically, the frequency response curves may represent the audio data output volume of the first and second devices for each frequency. Here, the frequency response curve information may be configured based on (i) some frequencies extracted in an entire frequency range included in the frequency response curve and (ii) some audio data output volumes for the some respective frequencies. The some frequencies may be points corresponding to inflection points represented by the entire frequency response curve, and may be configured as a form such as (x, y).

Among the information included in the capability information, the parameters 'Watt' and 'Broadcast support' may be information requisitively included in the capability information, and the remaining information may be optionally included in the capability information.

The source device transmits, to the sink device, a read request message for obtaining the capability information from a pushed audio capability (PAC) service related characteristics of the sink device storing the capability information, and receives, from the sink device, a read response message including the capability information to obtain the capability information.

The source device may determine whether to constitute the multi channel surround system jointly with the sink devices. When the source device determines that the multi channel surround system is constitute, the source device may perform an operation such as setup execution for the audio data output of the sink device to the sink device. On the contrary, when the source device determines that the multi channel surround system is not constituted, the source device may not perform the operation such as the setup execution for the audio data output of the sink device to the sink device. For example, when a difference in audio data output related capability between the sink devices identified based on the capability information is large, the source device may determine that the multi channel surround system is not constituted. That is, when the source device obtains the capability information from two sink devices, if the parameter 'Watt' of one sink device shows a value of 20 watt and the parameter 'Watt' of the remaining one sink device shows a value of 2 watt, the source device may determine that the multi channel surround system is not constituted jointly with the two sink devices.

Method of Performing, by Source Device, Setup for Audio Data Output for Sink Device—(Proposal 2)

The proposal relates to the method of performing, by the source device, the setup related the audio data output for the sink device, and may correspond to step S1150 of FIG. 11 above.

Table 3 below shows information (Opcodes) which the source device transmits in order to perform the setup related to the audio data output for the sink device. Here, the information which the source device transmits in order to perform the setup related to the audio data output for the sink device may be expressed as setup information, and may be variously expressed within a range of being interpreted as the same/similar meaning thereas, of course.

TABLE 3

| Opcode | Operation | Status | Section reference | Description |
|---|---|---|---|---|
| 0x | Set Individual Delay | M | Section | Set individual presentation_delay of this speaker |
| 0x | Set Individual Location | M | Section | Set Individual location of this speaker |

As shown in Table 3 above, the setup information for the setup related to the audio data output of the sink device, which the source device transmits to the sink device may include an Opcode 'Set Individual Delay' which is information on the audio data output time point of the sink device. The Opcode 'Set Individual Delay' may be expressed as output time point information, and may be variously expressed within a range of being interpreted as the same/similar meaning thereas, of course. Here, the output time point information may be configured based on a distance between the location of the sink device and the location of a use who hears the audio data output by the sink device.

More specifically, in the multi channel surround system, if the distance between the sink device which is the front speaker and the user is 3 m, the distance between the sink device which is the rear speaker and the user is 0 m, and velocities of the sounds of the audio data output for the speakers are 340 m (meter)/s (second), when the audio data are simultaneously output from the sink device which is the front speaker and the sink device which is the rear speaker, respectively, the sound of the audio data output for the front speaker reaches the user later than the sound of the audio data output from the rear speaker by approximately 0.1 second. In such a case, the audio data output time point of the sink device which is the rear speaker is may be set to a time point later than the audio data output time point of the sink device which is the front speaker by approximately 0.1 second based on the Opcode 'Set Individual Delay'. As such, the audio data output time point of the sink device may be appropriately set based on the output time point information included in the setup information.

Further, the setup information may include an Opcode 'Set Individual Location' which is information related to the location of the sink device in the multi channel surround system. The Opcode 'Set Individual Location' may be expressed as location information, and may be variously expressed within a range of being interpreted as the same/similar meaning thereas, of course. Here, the locations of the sink devices constituting the multi channel surround system may be determined based on the location information. The location information may indicate accurate locations where the sink devices should be positioned in the multi channel surround system.

Table 4 below shows parameters which the sink device receiving the setup information related to the audio data output from the source device may transmit to the source device in response to the setup information.

TABLE 4

| Parameter | Requirement | Mandatory Properties | Optional Properties | Security Permissions |
|---|---|---|---|---|
| Individual delay report | M | Read | None | None |
| Individual location report | M | Read | None | None |

An operation in which the sink device transmits the parameters shown in Table 4 above to the source device may correspond to step S1160 of FIG. 11 above.

In order to perform the setup for the audio data output for the sink device, the source device may transmit, to the sink device, a write request message for writing the location information and the output time point information in the audio stream control (ASC) service related characteristics of the sink device. Thereafter, the source device may receive, from the sink device, a write response message including information related to whether writing the location information and the output time point information is successful.

FIG. 12 is a flowchart illustrating an example of an operation implemented in a source device performing a method for transmitting, by a source device, audio data in a wireless communication system proposed by the present disclosure.

More specifically, the source device receives, from a first device and a second device, respectively, capability information related to audio data output capabilities of the first device and the second device (S1210).

Next, the source device determines whether to establish a channel for audio data transmission with the first device and the second device based on the capability information (S1220).

Thereafter, the source device transmits, to the first device and the second device, respectively, setup information for outputting audio data of the first device and the second device, based on the determination result (S1230).

Last, the source device transmits the audio data to the first device and the second device (S1240). Here, locations and audio data output time points of the first and second devices are determined based on the setup information.

FIG. 13 is a flowchart showing an example of an operation implemented in a sink device performing a method of receiving, by the sink device, the audio data in the wireless communication system proposed by the present disclosure.

More specifically, the sink device transmits, to a third device which is a source device, capability information related to an audio data output capability of the sink device (S1310).

Here, whether to establish a channel with the third device for receiving the audio data is determined based on the capability information.

Next, the sink device receives, from the third device, setup information for outputting audio data of the sink device based on whether the channel is established (S1320).

Thereafter, the sink device receives the audio data from third device (S1330).

Last, the sink device determines a location and an audio data output time point of the sink device based on the setup information (S1340).

Each of the source device of FIG. 12 above and the sink device of FIG. 13 above may include: a transmitter for transmitting a radio signal; a receiver for receiving the radio signal; and a processor operatively connected to the transmitter and the receiver, and the processor may control the transmitter and the receiver to perform the operations described in FIGS. 12 and 13, respectively.

It is apparent to those skilled in the art that the present disclosure can be embodied in other specific forms without departing from the essential characteristics of the present disclosure. Accordingly, the foregoing detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

What is claimed is:

1. A method of transmitting audio data, by a third device, in a short-range wireless communication system, the method comprising:
   receiving, from a first device and a second device, respectively, capability information related to audio data output capabilities of the first device and the second device;
   determining whether to establish a channel for audio data transmission with the first device and the second device based on the capability information;
   transmitting, to the first device and the second device, respectively, configuration information for outputting audio data of the first device and the second device, based on the determination result; and
   transmitting, to the first device and the second device, the audio data;
   wherein positions of the first device and the second device and an audio data output time of the first device and the second device are determined based on the configuration information, and
   wherein the capability information includes (i) broadcast support information on whether the first device and the second device can receive the audio data based on a broadcast method and (ii) effective audio data output volume information related to a volume at which the first device and the second device can output the audio data.

2. The method of claim 1,
   wherein the capability information includes frequency response range information related to a frequency range in which the first device and the second device can output the audio data.

3. The method of claim 2,
   wherein the capability information further comprises sound pressure level (SPL) information of the first device and the second device.

4. The method of claim 3,
   wherein the SPL information is determined based on audio data output volumes of the first device and the second device set to a specific value being measured at a specific distance.

5. The method of claim 4,
   wherein the specific value is 1 watt and the specific distance is 1 meter.

6. The method of claim 1,
   wherein the capability information further includes frequency response curve information related to the frequency response curves of the first device and the second device,
   wherein the frequency response curve represents audio data output volumes of the first device and the second device for each frequency, and
   wherein the frequency response curve information is configured based on (i) a partial frequency extracted from an entire frequency range included in the frequency response curve and (ii) a partial audio data output volume for each of the partial frequency.

7. The method of claim 2,
wherein the configuration information includes position information related to positions of the first device and the second device in the short-range wireless system.

8. The method of claim 7,
wherein the configuration information further includes output timing information on the audio data output time of the first device and the second device, and
wherein the output timing information is configured based on a distance between each of (i) positions of the first device and the second device and (ii) a position of a user listening to the audio data output from the first device and the second device.

9. The method of claim 8,
wherein receiving the capability information further comprises:
transmitting, to the first device and the second device, respectively, a read request message for obtaining the capability information from a first characteristic of the first device and the second device in which the capability information is stored; and
receiving, from the first device and the second device, respectively, a read response message including the capability information.

10. The method of claim 9,
wherein transmitting the configuration information further comprises:
transmitting, to the first device and the second device, respectively, a write request message for writing the position information and the output timing information to second characteristics of the first device and the second device; and
receiving, from the first device and the second device, respectively, a write response message including information related to whether or not the writing of the position information and the output timing information is successful.

11. The method of claim 10,
wherein the first characteristic is a Published Audio Capability Service (PACS) characteristic,
wherein the second characteristic is an Audio Stream Control Service (ASCS) characteristic.

12. A method of receiving audio data by a first device in a short-range wireless communication system, the method comprising:
transmitting, to a third device, capability information related to the audio data output capability of the first device,
wherein whether to establish a channel with the third device for receiving the audio data is determined based on the capability information, and
wherein the capability information includes (i) broadcast support information on whether the first device and the second device can receive the audio data based on a broadcast method and (ii) effective audio data output volume information related to a volume at which the first device and the second device can output the audio data;
receiving, from the third device, configuration information for outputting audio data of the first device based on whether the channel is established;
receiving, from the third device, the audio data; and
determining a position of the first device and an audio data output time of the first device based on the configuration information.

13. A third device for transmitting audio data in a short-range wireless communication system, the third device comprising:
a transmitter for transmitting a radio signal;
a receiver for receiving a radio signal; and
a processor operatively connected to the transmitter and the receiver;
wherein the processor is configured to:
receive, from a first device and a second device, respectively, capability information related to audio data output capabilities of the first device and the second device;
determine whether to establish a channel for audio data transmission with the first device and the second device based on the capability information;
transmit, to the first device and the second device, respectively, configuration information for outputting audio data of the first device and the second device, based on the determination result; and
transmit, to the first device and the second device, the audio data;
wherein positions of the first device and the second device and an audio data output time of the first device and the second device are determined based on the configuration information, and
wherein the capability information includes (i) broadcast support information on whether the first device and the second device can receive the audio data based on a broadcast method and (ii) effective audio data output volume information related to a volume at which the first device and the second device can output the audio data.

14. A first device for receiving audio data in a short-range wireless communication system, the first device comprising:
a transmitter for transmitting a radio signal;
a receiver for receiving a radio signal; and
a processor operatively connected to the transmitter and the receiver;
wherein the processor is configured to:
transmit, to a third device, capability information related to the audio data output capability of the first device,
wherein whether to establish a channel with the third device for receiving the audio data is determined based on the capability information, and
wherein the capability information includes (i) broadcast support information on whether the first device and the second device can receive the audio data based on a broadcast method and (ii) effective audio data output volume information related to a volume at which the first device and the second device can output the audio data;
receive, from the third device, configuration information for outputting audio data of the first device based on whether the channel is established;
receive, from the third device, the audio data; and
determine a position of the first device and an audio data output time of the first device based on the configuration information.

* * * * *